(12) United States Patent
Tseng et al.

(10) Patent No.: US 11,975,712 B2
(45) Date of Patent: May 7, 2024

(54) ADAPTIVE CRUISE CONTROL ACTIVATION

(71) Applicant: Ford Global Technologies, LLC, Dearborn, MI (US)

(72) Inventors: Fling Finn Tseng, Ann Arbor, MI (US); Himanshu Verma, Farmington Hills, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 17/533,284

(22) Filed: Nov. 23, 2021

(65) Prior Publication Data

US 2023/0159029 A1    May 25, 2023

(51) Int. Cl.
*B60W 30/14*    (2006.01)
*B60W 30/16*    (2020.01)
(Continued)

(52) U.S. Cl.
CPC ......... *B60W 30/143* (2013.01); *B60W 30/16* (2013.01); *B60W 40/04* (2013.01); *B60W 40/06* (2013.01); *B60W 40/08* (2013.01); *B60W 50/14* (2013.01); *B60W 2040/0809* (2013.01); *B60W 2050/0054* (2013.01); *B60W 2050/0083* (2013.01); *B60W 2050/143* (2013.01);
(Continued)

(58) Field of Classification Search
CPC ................ B60W 30/16; B60W 30/10; B60W 30/18163; B60W 2050/0075
See application file for complete search history.

(56) References Cited

U.S. PATENT DOCUMENTS 9,266,536 B2    2/2016   Loria et al.
9,399,471 B2    7/2016   Kim
(Continued)

FOREIGN PATENT DOCUMENTS

WO    2020201961 A1    10/2020

OTHER PUBLICATIONS

YouTube. (2017). Mercedes-Benz S-Class 2017: Active Distance Assist Distronic—Extended automatic re-start. YouTube. Retrieved May 31, 2023, from https://www.youtube.com/watch?v=9SdorVb3adE. (Year: 2017).*

*Primary Examiner* — Jaime Figueroa
*Assistant Examiner* — Jerrod Irvin Davis
(74) *Attorney, Agent, or Firm* — Frank A. MacKenzie; Bejin Bieneman PLC

(57) ABSTRACT

A computer includes a processor and a memory storing instructions executable by the processor to identify a first scenario in which a vehicle is operating from a plurality of scenarios, prompt an operator to activate an adaptive cruise control of the vehicle in response to a preference score for the first scenario being above a threshold, refrain from prompting the operator to activate the adaptive cruise control in response to the preference score for the first scenario being below the threshold, and activate the adaptive cruise control in response to receiving an input to activate the adaptive cruise control from the operator. The scenarios indicate at least one characteristic of a road on which the vehicle is traveling. The preference score indicates a preference of the operator for activating the adaptive cruise control in the first scenario.

20 Claims, 2 Drawing Sheets

(51) Int. Cl.
  *B60W 40/04* (2006.01)
  *B60W 40/06* (2012.01)
  *B60W 40/08* (2012.01)
  *B60W 50/00* (2006.01)
  *B60W 50/14* (2020.01)

(52) U.S. Cl.
  CPC . *B60W 2050/146* (2013.01); *B60W 2540/043* (2020.02); *B60W 2552/05* (2020.02); *B60W 2554/406* (2020.02); *B60W 2555/60* (2020.02); *B60W 2556/10* (2020.02)

(56) References Cited

U.S. PATENT DOCUMENTS

| | | | |
|---|---|---|---|
| 2009/0299598 A1* | 12/2009 | Boecker | B60W 30/18018 701/96 |
| 2011/0190972 A1* | 8/2011 | Timmons | G08G 1/167 701/31.4 |
| 2012/0078507 A1* | 3/2012 | Caveney | G08G 1/096716 701/414 |
| 2017/0313323 A1* | 11/2017 | Tseng | B60W 50/082 |
| 2018/0043891 A1* | 2/2018 | Pilutti | B60W 30/143 |
| 2018/0312164 A1* | 11/2018 | Sasabuchi | B60W 30/18018 |
| 2018/0356830 A1* | 12/2018 | Haghighat | G05D 1/0223 |
| 2019/0367025 A1 | 12/2019 | Pathak et al. | |
| 2020/0047771 A1* | 2/2020 | Yoon | B60W 50/082 |
| 2020/0317216 A1* | 10/2020 | Konrardy | B60W 30/182 |
| 2021/0053572 A1* | 2/2021 | Vasoya | G08G 1/0112 |
| 2021/0171030 A1 | 6/2021 | Lee et al. | |
| 2022/0306122 A1* | 9/2022 | Hoh | B60W 30/18163 |

* cited by examiner

ADAPTIVE CRUISE CONTROL ACTIVATION

BACKGROUND

Some vehicles are equipped with adaptive cruise control. Cruise control maintains a vehicle at a set speed without an operator providing input through an accelerator pedal. Adaptive cruise control is cruise control that lowers the speed of the vehicle when a slower-moving vehicle is ahead of the vehicle in order to maintain a distance from the slower-moving vehicle. Adaptive cruise control can also raise the speed of the vehicle back to the set speed when the slower-moving vehicle is no longer ahead of the vehicle.

DETAILED DESCRIPTION

Figure 1:
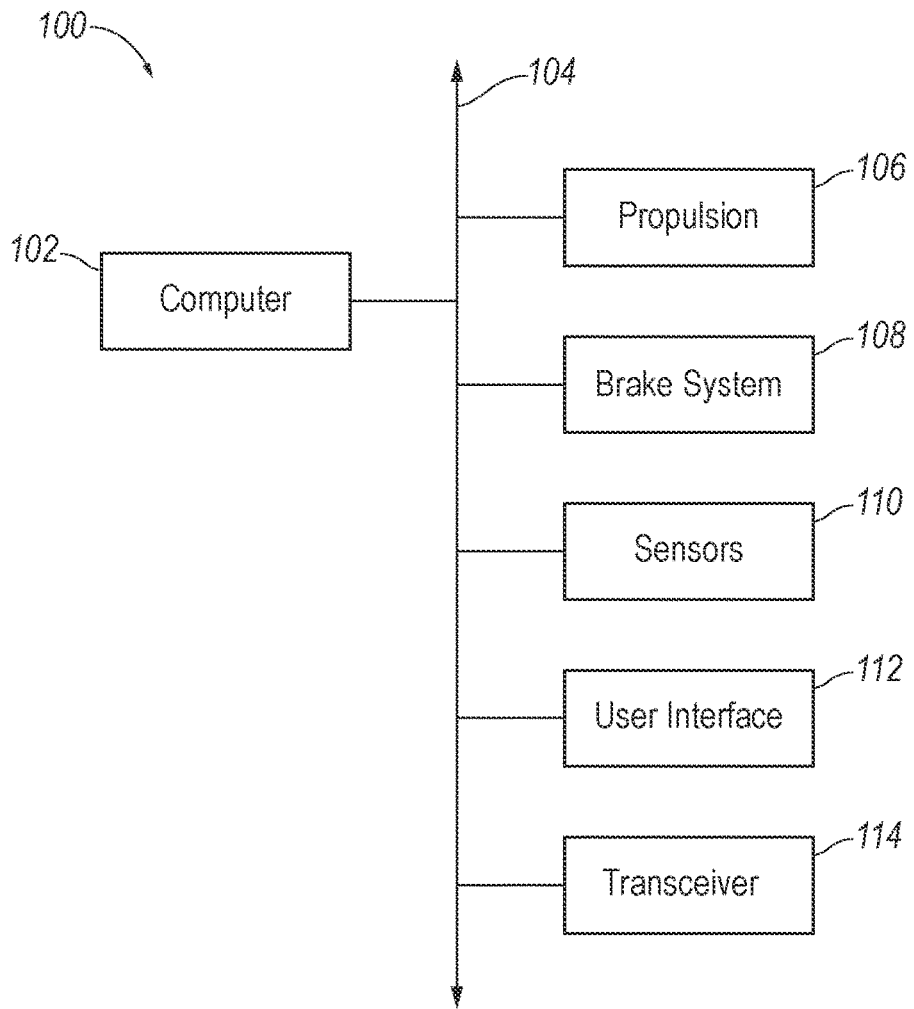
FIG. 1 is a block diagram of an example vehicle.

The systems and techniques described herein provide adaptive cruise control with a streamlined activation process based on learned scenarios in which the adaptive cruise control is likely to be activated. The operator can be prompted to activate or deactivate the adaptive cruise control depending on the operator's preference for using adaptive cruise control in a current scenario. The current scenario can indicate characteristics of a road on which the vehicle is traveling, e.g., a road type, a speed limit, a congestion level, a proximity to a congested area, etc. For example, a computer can be programmed to identify a first scenario in which the vehicle is operating, prompt the operator to activate the adaptive cruise control in response to a preference score above a threshold, refrain from prompting the operator in response to the preference score being below the threshold, and activate the adaptive cruise control in response to receiving an input to do so. By prompting the operator and waiting for the operator to activate the adaptive cruise control, the system can prevent vehicle behavior that may be unexpected by the operator. The system can also customize operation of the vehicle in a given scenario while the adaptive cruise control is active based on prior operation of the vehicle in the same scenario, e.g., by adjusting an acceleration profile and/or a following distance of the adaptive cruise control away from default values.

A computer includes a processor and a memory storing instructions executable by the processor to identify a first scenario in which a vehicle is operating from a plurality of scenarios, prompt an operator to activate an adaptive cruise control of the vehicle in response to a preference score for the first scenario being above a threshold, refrain from prompting the operator to activate the adaptive cruise control in response to the preference score for the first scenario being below the threshold, and activate the adaptive cruise control in response to receiving an input to activate the adaptive cruise control from the operator. The scenarios indicate at least one characteristic of a road on which the vehicle is traveling. The preference score indicates a preference of the operator for activating the adaptive cruise control in the first scenario.

The scenarios may include respective classifications of a road type.

The scenarios may include respective classifications of a speed limit.

The scenarios may include respective classifications of a congestion level.

The scenarios may include respective classifications of proximity to a congested area.

The scenarios may include respective classifications of at least one of a time of day or a day of the week.

The scenarios may include respective classifications of a frequency of the vehicle traveling on the road.

The scenarios may include respective ACC profiles based on data indicating historical operation of the vehicle by the operator in the respective scenarios. The instructions may further include instructions to, when the adaptive cruise control is active, operate the vehicle with the adaptive cruise control according to the ACC profile of the first scenario. The ACC profiles may control acceleration of the vehicle when a forward distance to a leading vehicle is greater than a following distance and a speed of the vehicle is below a target speed.

The input may be a first input, and the instructions may further include instructions to adjust the ACC profile of the first scenario in response to a second input received when the adaptive cruise control is active in the first scenario. The second input may indicate adjustment of a following distance.

The input may be a first input, the instructions may further include instructions to, upon receiving a second input from the operator indicating upcoming congestion, operate the vehicle with the adaptive cruise control according to the ACC profile of a second scenario, and the second scenario may include a classification of a proximity to a congested area as nearer than in the first scenario.

The instructions may further include instructions to adjust the ACC profile of the first scenario based on operation of the vehicle in the first scenario with the adaptive cruise control inactive.

The threshold may be a first threshold, and the instructions to prompt the operator to activate the adaptive cruise control may include to prompt the operator to activate the adaptive cruise control in response to the preference score for the first scenario being above the first threshold and the data indicating historical operation of the vehicle in the first scenario being above a second threshold. The instructions may further include instructions to, in response to receiving the input to activate the adaptive cruise control and the data indicating historical operation of the vehicle in the first scenario being below the second threshold, operate the vehicle with the adaptive cruise control according to a default ACC profile.

The input may be a first input, and the instructions may further include instructions to prompt the operator to deactivate the adaptive cruise control in response to the preference score for the first scenario being below the threshold and the adaptive cruise control being active, and to deactivate the adaptive cruise control in response to receiving a second input from the operator.

The instructions may further include instructions to adjust the preference score of the first scenario according to activation of the adaptive cruise control when the vehicle is in the first scenario.

The instructions may further include instructions to identify the operator, and the scenarios may be specific to the operator.

A method includes identifying a first scenario in which a vehicle is operating from a plurality of scenarios, prompting an operator to activate an adaptive cruise control of the vehicle in response to a preference score for the first scenario being above a threshold, refraining from prompting the operator to activate the adaptive cruise control in response to the preference score for the first scenario being below the threshold, and activating the adaptive cruise control in response to receiving an input to activate the adaptive cruise control from the operator. The scenarios indicate at least one characteristic of a road on which the vehicle is traveling. The preference score indicates a preference of the operator for activating the adaptive cruise control in the first scenario.

With reference to the Figures, wherein like numerals indicate like parts throughout the several views, a computer 102 includes a processor and a memory storing instructions executable by the processor to identify a first scenario in which a vehicle 100 is operating from a plurality of scenarios, prompt an operator to activate an adaptive cruise control of the vehicle 100 in response to a preference score for the first scenario being above a threshold, refrain from prompting the operator to activate the adaptive cruise control in response to the preference score for the first scenario being below the threshold, and activate the adaptive cruise control in response to receiving an input to activate the adaptive cruise control from the operator. A "scenario" means data specifying at least one characteristic of a road on which the vehicle 100 is traveling. The preference score is a value specifying a preference of the operator for activating the adaptive cruise control in the first scenario.

With reference to FIG. 1, the vehicle 100 may be any passenger or commercial automobile such as a car, a truck, a sport utility vehicle, a crossover, a van, a minivan, a taxi, a bus, etc.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 104 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to a propulsion 106, a brake system 108, sensors 110, a user interface 112, a transceiver 114, and other components via the communications network 104.

The propulsion 106 of the vehicle 100 generates energy and translates the energy into motion of the vehicle 100. The propulsion 106 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 106 can include an electronic control unit (ECU) or the like that is in communication with and receives input from the computer 102 and/or a human operator. The human operator may control the propulsion 106 via, e.g., an accelerator pedal and/or a gear-shift lever.

The brake system 108 is typically a conventional vehicle braking subsystem and resists the motion of the vehicle 100 to thereby slow and/or stop the vehicle 100. The brake system 108 may include friction brakes such as disc brakes, drum brakes, band brakes, etc.; regenerative brakes; any other suitable type of brakes; or a combination. The brake system 108 can include an electronic control unit (ECU) or the like that is in communication with and receives input from the computer 102 and/or a human operator. The human operator may control the brake system 108 via, e.g., a brake pedal.

The sensors 110 may provide data about operation of the vehicle 100, for example, wheel speed, wheel orientation, and engine and transmission data (e.g., temperature, fuel consumption, etc.). The sensors 110 may detect the location and/or orientation of the vehicle 100. For example, the sensors 110 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 110 may detect the external world, e.g., objects and/or characteristics of surroundings of the vehicle 100, such as other vehicles, road lane markings, traffic lights and/or signs, pedestrians, etc. For example, the sensors 110 may include radar sensors, scanning laser range finders, light detection and ranging (LIDAR) devices, and image processing sensors such as cameras.

The user interface 112 presents information to and receives information from an operator of the vehicle 100. The user interface 112 may be located, e.g., on an instrument panel in a passenger cabin of the vehicle 100, or wherever may be readily seen by the operator. The user interface 112 may include dials, digital readouts, screens, speakers, and so on for providing information to the operator, e.g., human-machine interface (HMI) elements such as are known. The user interface 112 may include buttons, knobs, keypads, microphone, and so on for receiving information from the operator.

The transceiver 114 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 114 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 114 may be one device or may include a separate transmitter and receiver.

Figure 2:
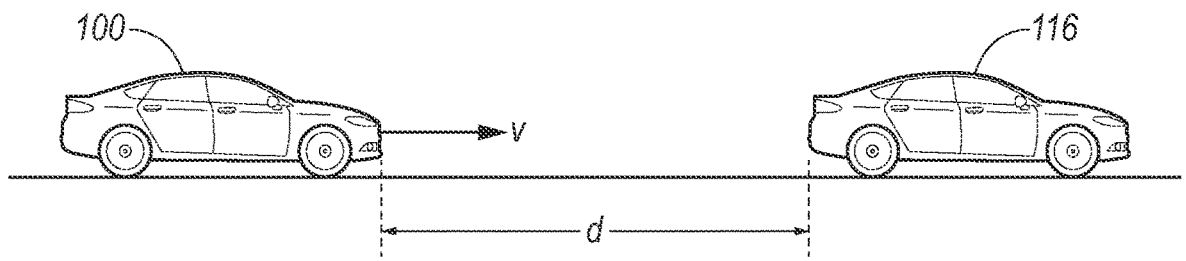
FIG. 2 is a diagrammatic side view of the vehicle following another vehicle while using adaptive cruise control.

With reference to FIG. 2, the computer 102 can be programmed to perform adaptive cruise control, i.e., to actuate the propulsion 106 and the brake system 108 according to an adaptive-cruise-control algorithm stored on the computer 102. The computer 102 can be programmed to, according to the adaptive cruise control, actuate the propulsion 106 and/or the brake system 108 to maintain a speed v of the vehicle 100 at a target speed $v_{target}$ and to accelerate up to the target speed $v_{target}$. The target speed $v_{target}$ can be an input from the operator. The computer 102 can be programmed to, according to the adaptive cruise control, vary the speed to maintain a forward distance d from the vehicle 100 to a leading vehicle 116 at a following distance $d_{following}$ when the leading vehicle 116 is traveling below the target speed $v_{target}$.

The computer 102 can be programmed to activate the adaptive cruise control, i.e., to begin actuating the propulsion 106 and the brake system 108 according to the adaptive-cruise-control algorithm, in response to receiving an input to activate the adaptive cruise control from the operator, e.g., via the user interface 112. The computer 102 can be programmed to deactivate the adaptive cruise control, i.e., to cease actuating the propulsion 106 and the brake system 108 according to the adaptive-cruise-control algorithm, in response to receiving an input to deactivate the adaptive cruise control from the operator, e.g., via the user interface 112 or via pressing the brake pedal. The computer 102 can lack programming to activate or deactivate the adaptive cruise control other than in response to inputs from the operator. Ultimate control over whether the adaptive cruise control is active can rest with the operator.

The computer 102 can be programmed to operate the vehicle 100 with the adaptive cruise control according to a default adaptive-cruise-control (ACC) profile. The default ACC profile can be stored in the memory of the computer 102. The default ACC profile can include a default following distance $d_{following,def}$. The default following distance $d_{following,def}$ can be a function of the speed v and/or of the target speed $v_{target}$. The default ACC profile can control acceleration of the vehicle 100 when the distance d to the leading vehicle 116 is greater than the following distance $d_{following}$ and the speed v of the vehicle 100 is below the target speed $v_{target}$. For example, the default ACC profile can include a default acceleration profile. An acceleration profile specifies an acceleration to instruct the propulsion 106 to produce in order to increase the speed v to the target $v_{target}$. For example, the default acceleration profile can describe the acceleration as a function of the speed v and/or of the target speed $v_{target}$. The acceleration profile can also specify a deceleration to instruct the propulsion 106 and the brake system 108 to produce when approaching the leading vehicle 116 to maintain the distance d above or equal to the following distance $d_{following}$.

As will be described below, the computer 102 can be programmed to adjust behavior of the adaptive cruise control based on which of a plurality of scenarios the vehicle 100 is in. The scenarios indicate at least one characteristic of a road on which the vehicle 100 is traveling. For example, the scenarios can indicate respective road types, speed limits, congestion levels, proximities to a congested area, etc. The scenarios can also indicate a relationship between the vehicle 100 and the road, e.g., frequencies of the vehicle 100 traveling on the road. The scenarios can also indicate a time of day or day of the week.

The scenarios are specific to the operator, i.e., are stored separately for each identified operator of the vehicle 100. As will be described below, the preference scores and data indicating historical operation of the vehicle 100 are tracked by scenario. This tracking is divided by the identity of the operator; i.e., the preference scores and historical operation data for each scenario is tracked separately for each operator.

The scenarios can include a plurality of classifications, e.g., of the characteristics of the roads on which the vehicle 100 travels. The scenarios can include classifications of the road type, the speed limit, the congestion level, the proximity to a congested area, the time of day and day of the week, and the frequency of the vehicle 100 traveling on the road. The proximity to a congested area indicates a distance along the road to the next high-congestion area. The scenarios can be discrete, i.e., a countable list of distinct scenarios, by divisions of the classifications. For example, the classification of the road type can be city, highway, or rural/offroad; the classification of the speed limit can be 0-15 miles per hour (mph), 16-30 mph, 31-50 mph, or 50+ mph; the classification of the congestion level can be low, medium, or high; the classification of the proximity to a congested area can be less than 50 meters (m), 50-100 m, 101-300 m, or more than 300 m; the classification of the time of day and day of the week can be one of 28 six-hour blocks of the week; and the classification of the frequency of the vehicle 100 traveling on the road can be in the top ten most frequent routes or outside the top ten. An example plurality of scenarios is given in the following table.

|  | Road Type | Speed Limit | Congestion | Proximity | Frequency |
| --- | --- | --- | --- | --- | --- |
| Scenario 1 | City | 0-15 | Medium | <50 | 1st |
| Scenario 2 | City | 15-30 | High | 50-100 | >10th |
| Scenario 3 | Highway | 15-30 | Medium | 101-300 | 2nd |
| Scenario 4 | Highway | 30-50 | Medium | >300 | 1st |
| Scenario 5 | Rural | 0-15 | Low | 50-100 | 3rd |
| Scenario 6 | Rural | 15-30 | Medium | 101-300 | 6th |
| Scenario 7 | Rural | 30-50 | High | >300 | 7th |

The computer 102 can be programmed to identify the scenario. For example, the computer 102 can determine the classifications for the road type and the speed limit based on GPS data from the sensors 110 and map data stored in the memory or received via the transceiver 114 by consulting the map data for a current location of the vehicle 100. The computer 102 can determine the congestion level and the proximity to a congested area similarly based on the GPS data, the map data, and traffic data received via the transceiver 114. The computer 102 can determine the classification for time of day and day of the week based on an on-board clock. The computer 102 can determine the classification of the frequency of the vehicle 100 traveling on the road based on the GPS data, the map data, and a tally stored in the memory of the number of trips on different routes.

The computer 102 can be programmed to track the preference scores for the scenarios. Each scenario can have a preference score. The preference score indicates a preference of the operator for activating the adaptive cruise control in the respective scenario. For example, the preference score can be a proportion of the time spent or distance traveled in the respective scenario in which the adaptive cruise control is active. For another example, the preference score can be a proportion of trips in the respective scenario in which the adaptive cruise control is activated. The computer 102 can be further programmed to track a proportion spent in each scenario, e.g., a proportion of driving time, mileage, etc. The following table shows example preference scores and proportions spent for the scenarios from the previous table.

|  | % All Drives | Preference Score |
| --- | --- | --- |
| Scenario 1 | 3 | 0.47 |
| Scenario 2 | 8 | 0.23 |
| Scenario 3 | 23 | 0.72 |
| Scenario 4 | 48 | 0.58 |
| Scenario 5 | 11 | 0.71 |
| Scenario 6 | 3 | 0.71 |
| Scenario 7 | 4 | 0.53 |

The computer 102 can be programmed to adjust the preference scores according to the activation of the adaptive cruise control when the vehicle 100 is in the respective scenarios, e.g., by adding the time, distance, or trip count increment traveled with the adaptive cruise control active or inactive to the numerator and/or denominator of the proportion used as the preference score.

The computer 102 can determine ACC profiles for the respective scenarios based on data indicating historical operation of the vehicle 100 by the operator in the respective scenarios, i.e., with the adaptive cruise control inactive. For example, the computer 102 can track acceleration of the vehicle 100 and store data describing the acceleration in the respective scenario, e.g., when accelerating up to a set speed or decelerating when encountering a slower-moving leading vehicle 116. For example, the computer 102 can track statistical measures of the acceleration in the respective scenarios, e.g., mean, standard deviation, skew, and kurtosis. The computer 102 can generate an ACC profile including an acceleration profile for a respective scenario using the data describing the acceleration by the operator in that scenario, e.g., the statistical measures. The acceleration profile can be generated to mimic or approximate the acceleration used by the operator, e.g., to produce the same values for the statistical measures. After an acceleration profile is generated, the computer 102 can be programmed to adjust the acceleration profile based on operation of the vehicle 100 in that scenario with the adaptive cruise control inactive.

When the adaptive cruise control is active, the computer 102 can be programmed to operate the vehicle 100 with the adaptive cruise control according to the ACC profile of the identified scenario instead of the default ACC profile. For example, the ACC profile of the identified scenario can control acceleration of the vehicle 100 when the distance d to the leading vehicle 116 is greater than the following distance $d_{following}$ and the speed v of the vehicle 100 is below the target speed $v_{target}$. For another example, the ACC profile can control deceleration (i.e., negative acceleration) when the vehicle 100 is approaching the leading vehicle 116 that is traveling more slowly than the vehicle 100. The computer 102 can instruct the propulsion 106 and/or the brake system 108 to produce an acceleration specified by the ACC profile for the identified scenario. The computer 102 can use values from the default ACC profile for any values not specified in the ACC profile for the identified scenario.

When the adaptive cruise control is active, the computer 102 can be programmed to operate the vehicle 100 with the adaptive cruise control according to the ACC profile for the identified scenario in response to the historical operation data in the identified scenario being above a historical-operation threshold. The computer 102 can be programmed to, in response to receiving an input to activate the adaptive cruise control and the historical operation data in the identified scenario being below the historical-operation threshold, operate the vehicle 100 with the adaptive cruise control according to the default ACC profile. For example, the computer 102 can compare a total time spent with the operator operating the vehicle 100 with the adaptive cruise control inactive in the identified scenario (i.e., a total time spent gathering the historical operation data by the operator in the identified scenario) with the historical-operation threshold, specified in units of time. The historical-operation threshold can be chosen as a quantity of time sufficient to produce data indicating historical operation having statistical significance. For another example, the computer 102 can compare a percentage difference between the ACC profile for the identified scenario and operation by the operator during a most recent trip in the identified scenario. The most-recent operation can be smoothed by a low-pass filter before the comparison. The quantity of historical operation data can exceed the historical-operation threshold when the percentage difference between the ACC profile and the most-recent operation is not statistically significant.

The computer 102 can be programmed to prompt the operator to activate the adaptive cruise control in response to the preference score for the identified scenario being above a preference-score threshold, or in response to the preference score being above the preference-score threshold and the data indicating historical operation in the identified scenario being above the historical-operation threshold. The preference-score threshold can be chosen to indicate that the operator prefers using the adaptive cruise control to not using the adaptive cruise control, e.g., 0.5. The computer 102 can prompt the operator to activate the adaptive cruise control by outputting a message via the user interface 112, e.g., a spoken and/or written message "Activate ACC?" The computer 102 can be programmed to refrain from prompting the operator to activate the adaptive cruise control in response to the preference score for the identified scenario being below the preference-score threshold. The computer 102 can be programmed to refrain from prompting the operator to activate the adaptive cruise control in response to the data indicating historical operation in the identified scenario being below the historical-operation threshold.

The computer 102 can be programmed to prompt the operator to deactivate the adaptive cruise control in response to the preference score for the identified scenario being below the preference-score threshold and the adaptive cruise control being active. This can occur, e.g., when the vehicle 100 switches scenarios, i.e., when the computer 102 identifies a scenario different than the previously identified scenario. The computer 102 can prompt the operator to deactivate the adaptive cruise control by outputting a message via the user interface 112, e.g., a spoken and/or written message "Deactivate ACC?"

The computer 102 can be programmed to adjust the ACC profile of the identified scenario in response to an input received when the adaptive cruise control is active in the identified scenario. For example, the input can indicate adjustment of the following distance, e.g., increasing or decreasing the following distance $d_{following}$. The computer 102 can adjust the following distance $d_{following}$ by applying a multiplier, e.g., increasing or decreasing by 10%. For another example, the input can indicate adjustment of the acceleration profile, e.g., raising or lowering the acceleration used to increase the speed v to the target speed $v_{target}$ or raising or lowering the deceleration used to slow the vehicle 100 when approaching the leading vehicle 116, e.g., increasing or decreasing by 10%.

The computer 102 can be programmed to change the identified scenario in response to an input from the operator changing at least one of the classifications. For example, the input can specify the road type, e.g., by selecting a point on a map, e.g., if the GPS data is unavailable. For another example, the input can specify the congestion level or the proximity to a congested area, e.g., if the traffic data is unavailable or out-of-date. When the identified scenario changes while the adaptive cruise control is active, the computer 102 can switch to using the ACC profile of the new identified scenario for operating the propulsion 106 and the brake system 108 according to the adaptive cruise control.

For example, the input can specify that the congestion level is high, e.g., if the vehicle 100 has encountered a congested area and the traffic data is out-of-date. The computer 102 can then use the ACC profile for the new identified scenario, which includes the classification for the congestion level as high. The ACC profile for the new identified scenario may include an acceleration profile that smooths the accelerations and decelerations with the leading vehicle 116, e.g., accelerating more slowly and braking sooner and with less force than the default ACC profile.

For another example, the input can specify that the proximity to a congested area is 50-100 m, e.g., if the traffic data is out-of-date and did not include the upcoming congested area. The computer 102 can then use the ACC profile for the new identified scenario, which includes the classification for the proximity to a congested area as nearer than in the previous identified scenario, e.g., from more than 300 m in the previous identified scenario to 50-100 m in the new identified scenario. The computer 102 can then use the ACC profile for the new identified scenario, which includes the classification for the proximity to a congested area as nearer. The ACC profile may include an acceleration profile that brakes sooner and with less force than the default ACC profile and less force than the ACC profile for the previous identified scenario.

Figure 3:
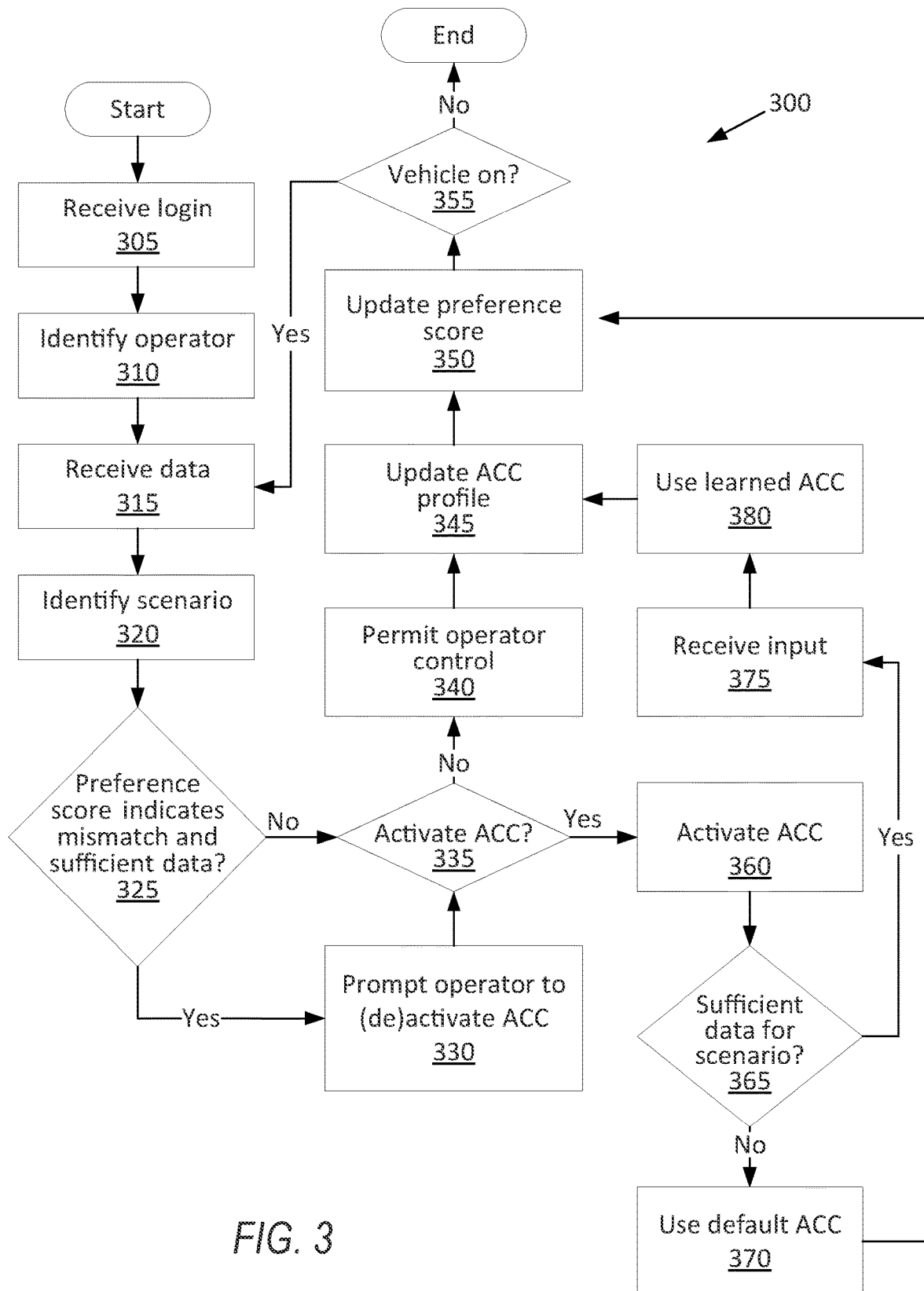
FIG. 3 is a process flow diagram of an example process for operating the adaptive cruise control of the vehicle.

FIG. 3 is a process flow diagram illustrating an exemplary process 300 for operating the adaptive cruise control of the vehicle 100. The memory of the computer 102 stores executable instructions for performing the steps of the process 300 and/or programming can be implemented in structures such as mentioned above. As a general overview of the process 300, the computer 102 receives a login from the operator, identifies the operator, receives data, and identifies the scenario. If the preference score is above the preference-score threshold and the adaptive cruise control is inactive, the computer 102 prompts the operator to activate the adaptive cruise control. If the preference score is below the preference-score threshold and the adaptive cruise control is active, the computer 102 prompts the operator to deactivate the adaptive cruise control. If the computer 102 receives an input to deactivate the adaptive cruise control (or if the computer 102 receives no input and the adaptive cruise control is inactive), the computer 102 permits the operator to operate the propulsion 106 and the brake system 108, adjusts the ACC profile for the identified scenario, and adjusts the preference score for the identified scenario. If the computer 102 receives an input to activate the adaptive cruise control (or if the computer 102 receives no input and the adaptive cruise control is active), the computer 102 operates the propulsion 106 and the brake system 108 according to the adaptive cruise control. If the historical operation data is above the historical-operation threshold, the computer 102 receives input from the operator, operates the vehicle 100 according to the adaptive cruise control with the ACC profile of the identified scenario, adjusts the ACC profile, and adjusts the preference score. If the historical operation data is below the historical-operation threshold, the computer 102 operates the vehicle 100 according to the adaptive cruise control with the default ACC profile, and adjusts the preference score. The process 300 continues for as long as the vehicle 100 remains on.

The process 300 begins in a block 305, in which the computer 102 receives data of the operator of the vehicle 100, e.g., identifying data from the user interface 112.

Next, in a block 310, the computer 102 identifies the operator. For example, the operator can use a keyfob or the like to start the vehicle 100, and the keyfob can have an RFID tag or the like uniquely specifying the operator from among other potential operators who regularly use the vehicle 100. The RFID signal can be associated with the operator in memory. For another example, a mobile phone or device of the occupant can pair with, e.g., the user interface 112 or transceiver 114 of the vehicle 100. The mobile phone or device can be associated with the operator in memory. For another example, the computer 102 can use image data from a camera having a field of view in a passenger cabin of the vehicle 100 including a face of the operator and can identify the occupant using image-recognition techniques as are known. For another example, the operator can enter identifying information such as a username and password into the user interface 112.

Next, in a block 315, the computer 102 receives data for identifying the scenario, e.g., GPS data, map data, traffic data, etc., as described above.

Next, in a block 320, the computer 102 identifies a scenario in which the vehicle 100 is operating from the plurality of scenarios for the identified operator, as described above.

Next, in a decision block 325, the computer 102 determines whether a mismatch exists between the preference score for the identified scenario and the status of the adaptive cruise control. A mismatch occurs when the preference score is above the preference-score threshold and the adaptive cruise control is inactive or when the preference score is below the preference-score threshold and the adaptive cruise control is active, as described above. The computer 102 may ignore a mismatch if the historical operation data is below the historical-operation threshold, as described above. In response to a mismatch occurring, the process 300 proceeds to a block 330 to prompt the operator to change the status of the adaptive cruise control. In response to a match, the computer 102 refrains from prompting the operator to change the status of the adaptive cruise control, and the process 300 proceeds to a decision block 335.

In the block 330, the computer 102 prompts the operator to activate the adaptive cruise control if the adaptive cruise control is inactive or prompts the operator to deactivate the adaptive cruise control if the adaptive cruise control is active, as described above. After the block 330, the process 300 proceeds to the decision block 335.

In the decision block 335, the computer 102 determines whether the status of the adaptive cruise control should be set to active or inactive. If the computer 102 received an input to activate the adaptive cruise control or if the computer 102 has received no input and the adaptive cruise control is already active, the computer 102 determines that the adaptive cruise control should be set to active. If the computer 102 received an input to deactivate the adaptive cruise control or if the computer 102 has received no input and the adaptive cruise control is already inactive, the computer 102 determines that the adaptive cruise control should be set to inactive. If the adaptive cruise control should be set to inactive, the process 300 proceeds to a block 340. If the adaptive cruise control should be set to active, the process 300 proceeds to a block 360.

In the block 340, the computer 102 deactivates the adaptive cruise control if active and permits the operator control over the propulsion 106 and the brake system 108.

Next, in a block 345, the computer 102 adjusts the ACC profile of the identified scenario. The computer 102 can adjust the ACC profile based on operation of the vehicle 100 in the identified scenario with the adaptive cruise control inactive in the block 340, as described above. The computer 102 can also adjust the ACC profile based on inputs received from the operator in the identified scenario when the adaptive cruise control is active in a block 375 below, as described above.

Next, in a block 350, the computer 102 adjusts the preference score of the identified scenario according to the activation or deactivation of the adaptive cruise control when the vehicle 100 is in the identified scenario, as described above.

Next, in a decision block 355, the computer 102 determines whether the vehicle 100 is still on. If so, the process 300 returns to the block 315 to continue receiving data for identifying the scenario. If not, the process 300 ends.

In the block 360, the computer 102 activate the adaptive cruise control if inactive and operates the propulsion 106 and the brake system 108 according to the adaptive cruise control.

Next, in a decision block 365, the computer 102 determines whether the historical operation data in the identified scenario is above the historical-operation threshold, as described above. If not, the process 300 proceeds to a block 370. If so, the process 300 proceeds to a block 375.

In the block 370, the computer 102 operates the vehicle 100 (i.e., the propulsion 106 and the brake system 108) according to the default ACC profile, as described above. After the block 370, the process 300 proceeds to the block 350 to update the preference score and restart the process 300.

In the block 375, the computer 102 operates the vehicle 100 (i.e., the propulsion 106 and the brake system 108) according to the ACC profile of the identified scenario, as described above.

Next, in the block 380, the computer 102 receives inputs from the operator. For example, the computer 102 can receive an input to change the identified scenario, as described above, which will result in a different scenario being identified in the block 320 in the next iteration through the process 300. For another example, the computer 102 can receive an input to adjust the ACC profile, as described above, which will result in different operation of the adaptive cruise control in the block 375 in the next iteration through the process 300. After the block 380, the process 300 proceeds to the block 345 to adjust the ACC profile and preference score and restart the process 300.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   identify a first scenario in which a vehicle is operating from a plurality of scenarios, the scenarios indicating at least one characteristic of a road on which the vehicle is traveling;
   track a value for a proportion of travel in the first scenario spent with the adaptive cruise control active;
   determine a preference score indicating a preference of an operator for activating an adaptive cruise control of the vehicle in the first scenario based on the value for the proportion of travel in the first scenario spent with the adaptive cruise control active;
   prompt the operator to activate the adaptive cruise control of the vehicle in response to the preference score for the first scenario being above a threshold;
   refrain from prompting the operator to activate the adaptive cruise control in response to the preference score for the first scenario being below the threshold; and
   activate the adaptive cruise control in response to receiving an input to activate the adaptive cruise control from the operator.

2. The computer of claim 1, wherein the scenarios include respective classifications of a road type.

3. The computer of claim 1, wherein the scenarios include respective classifications of a speed limit.

4. The computer of claim 1, wherein the scenarios include respective classifications of a congestion level.

5. The computer of claim 1, wherein the scenarios include respective classifications of proximity to a congested area.

6. The computer of claim 1, wherein the scenarios include respective classifications of at least one of a time of day or a day of the week.

7. The computer of claim 1, wherein the scenarios include respective classifications of a frequency of the vehicle traveling on the road.

8. The computer of claim 1, wherein the scenarios include respective ACC profiles based on data indicating historical operation of the vehicle by the operator in the respective scenarios.

9. The computer of claim 8, wherein the instructions further include instructions to, when the adaptive cruise control is active, operate the vehicle with the adaptive cruise control according to the ACC profile of the first scenario.

10. The computer of claim 9, wherein the ACC profiles control acceleration of the vehicle when a forward distance to a leading vehicle is greater than a following distance and a speed of the vehicle is below a target speed.

11. The computer of claim 9, wherein the input is a first input, and the instructions further include instructions to adjust the ACC profile of the first scenario in response to a second input received when the adaptive cruise control is active in the first scenario.

12. The computer of claim 11, wherein the second input indicates adjustment of a following distance.

13. The computer of claim 9, wherein the input is a first input, the instructions further include instructions to, upon receiving a second input from the operator indicating upcoming congestion, operate the vehicle with the adaptive cruise control according to the ACC profile of a second scenario, and the second scenario includes a classification of a proximity to a congested area as nearer than in the first scenario.

14. The computer of claim 8, wherein the instructions further include instructions to adjust the ACC profile of the first scenario based on operation of the vehicle in the first scenario with the adaptive cruise control inactive.

15. The computer of claim 8, wherein the threshold is a first threshold, and the instructions to prompt the operator to activate the adaptive cruise control includes to prompt the operator to activate the adaptive cruise control in response to the preference score for the first scenario being above the first threshold and the data indicating historical operation of the vehicle in the first scenario being above a second threshold.

16. The computer of claim 15, wherein the instructions further include instructions to, in response to receiving the input to activate the adaptive cruise control and the data indicating historical operation of the vehicle in the first scenario being below the second threshold, operate the vehicle with the adaptive cruise control according to a default ACC profile.

17. The computer of claim 1, wherein the input is a first input, and the instructions further include instructions to prompt the operator to deactivate the adaptive cruise control in response to the preference score for the first scenario being below the threshold and the adaptive cruise control being active, and to deactivate the adaptive cruise control in response to receiving a second input from the operator.

18. The computer of claim 1, wherein the instructions further include instructions to adjust the preference score of the first scenario according to activation of the adaptive cruise control when the vehicle is in the first scenario.

19. The computer of claim 1, wherein the instructions further include instructions to identify the operator, and the scenarios are specific to the operator.

20. A method comprising:
   identifying a first scenario in which a vehicle is operating from a plurality of scenarios, the scenarios indicating at least one characteristic of a road on which the vehicle is traveling;
   tracking a value for a proportion of travel in the first scenario spent with the adaptive cruise control active;

determining a preference score indicating a preference of an operator for activating an adaptive cruise control of the vehicle in the first scenario based on the value for the proportion of travel in the first scenario spent with the adaptive cruise control active;

prompting the operator to activate the adaptive cruise control of the vehicle in response to the preference score for the first scenario being above a threshold;

refraining from prompting the operator to activate the adaptive cruise control in response to the preference score for the first scenario being below the threshold; and activating the adaptive cruise control in response to receiving an input to activate the adaptive cruise control from the operator.

\* \* \* \* \*